(12) United States Patent
Cocks et al.

(10) Patent No.: US 10,496,520 B2
(45) Date of Patent: Dec. 3, 2019

(54) REQUEST MONITORING TO A CODE SET

(71) Applicant: INTERNATIONAL BUSINESS MACHINES CORPORATION, Armonk, NY (US)

(72) Inventors: Martin W. Cocks, Hursley (GB); Martin J. Rowe, Hursley (GB); David J. Seager, Hursley (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 47 days.

(21) Appl. No.: 14/940,526

(22) Filed: Nov. 13, 2015

(65) Prior Publication Data

US 2016/0140020 A1 May 19, 2016

(30) Foreign Application Priority Data

Nov. 17, 2014 (GB) .................................. 1420367.3

(51) Int. Cl.
*G06F 11/36* (2006.01)

(52) U.S. Cl.
CPC ................................ *G06F 11/3636* (2013.01)

(58) Field of Classification Search
None
See application file for complete search history.

(56) References Cited

U.S. PATENT DOCUMENTS

| | | | |
|---|---|---|---|
| 7,681,182 B1 | 3/2010 | Mistry et al. | |
| 8,032,866 B1 | 10/2011 | Golender et al. | |
| 8,108,839 B2 | 1/2012 | Clark | |
| 8,527,960 B2 | 9/2013 | Schmelter et al. | |
| 8,799,719 B2 | 8/2014 | Shazly | |
| 9,450,849 B1* | 9/2016 | Goldberg | ............ H04L 43/0876 |
| 9,559,849 B1* | 1/2017 | Wasiq | ................... H04L 9/3247 |
| 2006/0282708 A1 | 12/2006 | Jiang et al. | |
| 2008/0016500 A1 | 1/2008 | Hinkley et al. | |

(Continued)

FOREIGN PATENT DOCUMENTS

| | | |
|---|---|---|
| CN | 101118502 A | 2/2008 |
| CN | 101137160 A | 3/2008 |

(Continued)

OTHER PUBLICATIONS

International Search Report & Written Opinion for PCT Application No. PCT/IB2015/058075, dated Feb. 14, 2016 (10 pages).

(Continued)

*Primary Examiner* — Wynuel A Aquino
*Assistant Examiner* — Melissa A Headly
(74) *Attorney, Agent, or Firm* — William A. Kinnaman, Jr., Esq.; Kevin P. Radigan, Esq.; Heslin Rothenberg Farley & Mesiti, P.C.

(57) ABSTRACT

A method of monitoring requests to a code set is provided, which includes: receiving a request to the code set; creating a trace for the request, the trace defining the path of the request through the code set; accessing a plurality of stored trace patterns, each stored trace pattern defining an acceptable path of a request through the code set; comparing the created trace to the stored trace patterns; and storing the created trace if it does not match one of the stored trace patterns.

12 Claims, 5 Drawing Sheets

(56) References Cited

U.S. PATENT DOCUMENTS

| | | | |
|---|---|---|---|
| 2008/0092123 A1 | 4/2008 | Davison et al. | |
| 2009/0320021 A1* | 12/2009 | Pan | G06F 11/0715 |
| | | | 718/100 |
| 2010/0083237 A1* | 4/2010 | Kneebone | G06F 8/443 |
| | | | 717/128 |
| 2010/0100774 A1 | 4/2010 | Ding et al. | |
| 2012/0124428 A1 | 5/2012 | Zeng et al. | |
| 2013/0145350 A1 | 6/2013 | Marinescu | |
| 2014/0317604 A1* | 10/2014 | Gataullin | G06F 11/3676 |
| | | | 717/128 |

FOREIGN PATENT DOCUMENTS

| | | |
|---|---|---|
| CN | 101923510 A | 12/2010 |
| CN | 102222015 A | 10/2011 |
| JP | 2000-047901 A | 2/2000 |
| JP | 2002-175201 A | 6/2002 |
| JP | 2005-352673 A | 12/2005 |
| JP | 2010-079343 A | 4/2010 |
| JP | 2011-103110 A | 5/2011 |
| JP | 4906760 B2 | 3/2012 |
| WO | WO 2008/129635 A1 | 7/2010 |

OTHER PUBLICATIONS

Gabel et al., "Javert: Fully Automatic Mining of General Temporal Properties from Dynamic Traces", Proceedings of the 16th ACM International Symposium on Foundations of Software Engineering, SIGSOFT '08/FSE-16, Nov. 9-16, 2008 (pp. 339-349).

Anonymous, "Automating Traversal of Function Call Graphs Contained in Program Execution Trace", IBM Corporation, IP.com Disclosure No. IPCOM000198336D (Aug. 5, 2010) (12 pages).

Search Report for GB Application No. GB1040367.3, dated May 26, 2015 (3 pages).

* cited by examiner

US 10,496,520 B2

REQUEST MONITORING TO A CODE SET

PRIOR FOREIGN APPLICATION

This application claims priority from United Kingdom (GB) patent application number 1420367.3, filed Nov. 17, 2014, which is hereby incorporated herein by reference in its entirety.

BACKGROUND

In many computing environments, a very large number of instructions may be handled by a computer in a short space of time. For example, a server which is operating a website for a large enterprise such as a bank will be handling a very large number of requests and transactions every second, often running into the thousands per second. Such a computing system has to run very complex software in order to maintain acceptable levels of security and liability. In such a complex computing environment, error detection and monitoring is important. Many different techniques are used in such environments, one of which is known as trace.

In software engineering, tracing is a specialized type of logging in order to record information about a program's execution. This information can be used by programmers for debugging purposes, and additionally, depending on the type and detail of information contained in a trace log, by experienced system administrators or technical support personnel and software monitoring tools to diagnose common problems with the software.

In a big data environment, where many requests are made to a server, it is often impractical to enable trace to capture a problem. Trace can create many gigabytes of data, because so many transactions or requests are running concurrently. However, Level 3 support (the highest level of support in a three-tiered technical support model responsible for handling the most difficult or advanced problems) often need to use trace to figure out why a problem has happened. Such an environment could be the IBM® MQ Messagesight appliance, which handles many thousands of requests concurrently, or the IBM CICS® Transaction Server, which handles thousands of transactions per second. (IBM® and CICS® are registered trademarks of International Business Machines Corporation, Armonk, N.Y., USA. Other names used herein may be registered trademarks, trademarks or product names of International Business Machines Corporation, or other companies).

SUMMARY

According to one aspect of the present invention, a method of monitoring requests to a code set is provided. The method includes: receiving a request to the code set; creating a trace for the request, the trace defining the path of the request through the code set; accessing a plurality of stored trace patterns, each stored trace pattern defining an acceptable path of a request through the code set; comparing the created trace to the stored trace patterns; and storing the created trace if it does not match one of the stored trace patterns.

According to another aspect of the present invention, a system for monitoring requests to a code set is provided herein. The system includes a memory, and a processor communicatively coupled to the memory, wherein the system performs a method comprising: receiving a request to the code set, creating a trace for the request, the trace defining the path of the request through the code set, accessing a plurality of stored trace patterns, each stored trace pattern defining an acceptable path of a request through the code set, comparing the created trace to the storing trace patterns, and storing the created trace if it does not match one of the stored trace patterns.

According to a further aspect of the present invention, a computer program product is provided herein for monitoring requests to a code set. The computer program product includes a computer readable storage medium having program instructions embodied therewith, the program instructions being executable by a processor to perform a method comprising: receiving a request to the code set; creating a trace for the request, the trace defining the path of the request through the code set; accessing a plurality of stored trace patterns, each stored trace pattern defining an acceptable path of a request through the code set; comparing the created trace to the stored trace patterns; and storing the created trace if it does not match one of the stored trace patterns.

BRIEF DESCRIPTION OF THE DRAWINGS

Embodiments of the present invention are described below, by way of example only, with reference to the drawings, in which.

DETAILED DESCRIPTION

Figure 1:
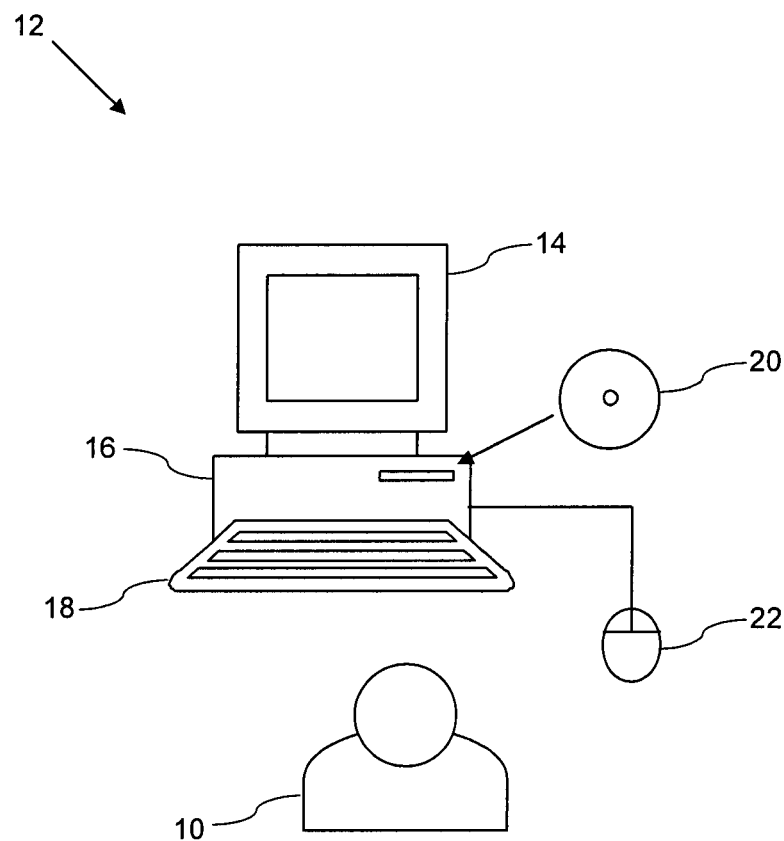
FIG. 1 is a schematic diagram of a computing system to incorporate one or more aspects of the present invention.

Owing to the invention, it is possible to provide a method by which useful trace data is captured, but the amount of data captured is much reduced compared to an indiscriminate use of trace. The idea is to capture trace patterns which show the path that request make through code sets. These patterns are used to indicate which paths are normal for the system and so allow abnormal paths to be identified during execution. Such patterns might detail which code modules and functions are invoked, optionally with the contents of the entry and exit parameters, but no further detail. In one embodiment, while trace is enabled for a system, the trace is captured to memory and at intervals, such as a request completes or a buffer is filled, the trace is compared against the patterns. For each request/thread, if the request matches a normal pattern then the trace is destroyed and does not use any space on disk or memory. If the pattern is unusual, then the trace is preserved and can be provided to support. A request can be defined in the environment, for example, in CICS® Transaction Server, a request would be activities in the life time of a transaction, whereas in a Web server, the request would be activities from a HTTP request coming in until a HTTP response has been provided.

In an alternative embodiment, the normal patterns can be used to ignore trace calls for a request that is executing a normal path. If that request were to then deviate from that path the trace calls would result in trace data being recorded. This would reduce storage usage for trace and make it simpler for the person analyzing trace output to identify the one or two requests that are not executing as expected. In the one or more embodiments described above, the trace may be captured first to disk, then deleted. In this alternative embodiment, trace is not captured to disk but is written to disk if it is unusual.

A further optional extension is to use a partial pattern that matches the initial flow through modules, where any request matching this partial pattern will be traced and compared to good patterns, whereas any request not matching the trace will be destroyed. In this way it is possible to stipulate a specific code path to trace and exclude all other paths, thus a pattern for every possible code path does not need to be provided. This can be used in an environment where many requests are being run per second, to take a trace of a specific bad path. For example, a customer can provide an error with a stack trace showing which modules were entered and exited before the error happened. A level 3 representative could make a trace pattern of this path, and provide it to the customer system and turn on this mode described in this paragraph. The customer system would then not trace every request/transaction, but only the request which has generated the error. Therefore, even in a system with thousands of requests per second, it is possible to capture trace for a single specific bad path through the code. If normal trace was enabled on such a system, the trace log would fill quickly and it would be difficult to track down the trace for the bad request, without taking a several gigabyte or more trace and doing post processing on it.

Another optional extension is to be able to monitor the system, and indicate the number of "bad" patterns encountered, or count the number of each pattern found, to provide some useful metrics to the user of the system. If a lot of bad patterns are happening this could indicate some problem in the system. Such bad patterns could be generated by security attacks, other systems being used being down or unreliable. The advantage is instead of enabling trace, a system administrator can be provided with a partial pattern for enabling trace analysis to load up. They load this and their system will only capture trace when the specified modules or functions are run. Alternatively, the user is provided with a set of good patterns, and then when enabling trace, only requests which look bad have their trace captured and saved.

FIG. 1 shows a network administrator 10 using a desktop computer system 12 to monitor the performance of a complex code set. The computer system 12 comprises a display device 14, a processor 16 and a user input device (a conventional keyboard) 18. The processor 16 is connected to the display device 14 and the user input device 18. The processor 16 is running an operating system with which the user 10 can interact via a graphical user interface of the operating system, which is being displayed by the display device 14. A CD-ROM 20 is shown, which can be used to store a copy of a computer program product which is being executed by the processor 16.

An additional user interface device 22 is also shown, which may be a conventional mouse 22. The user 10 utilizes the keyboard 18 and mouse 22 to interact with the operating system and applications being run by the processor 16. The code set being monitored can also be executed by the computing system 12, or more likely, may be executed by one or more connected servers that are located remotely from the computing system 12. The code set could be, for instance, an enterprise computer system such as used by a financial institution, such as a bank, to provide a website to allow customers of the bank to access their accounts and perform transactions online.

The code set handles many thousands of requests per second and monitoring is provided by using a trace function on some, though not all, of the requests being received by the code set. The code set is configured so that only a certain amount of trace data is captured, in order to provide sufficient feedback to the network administrator 10, without requiring a very large storage overhead to store all of the trace data that would otherwise be generated if every single request to the code set had trace enabled. Tracing is a specialized type of logging which records information about the code set's execution, as requests are processed after receipt.

Figure 2:
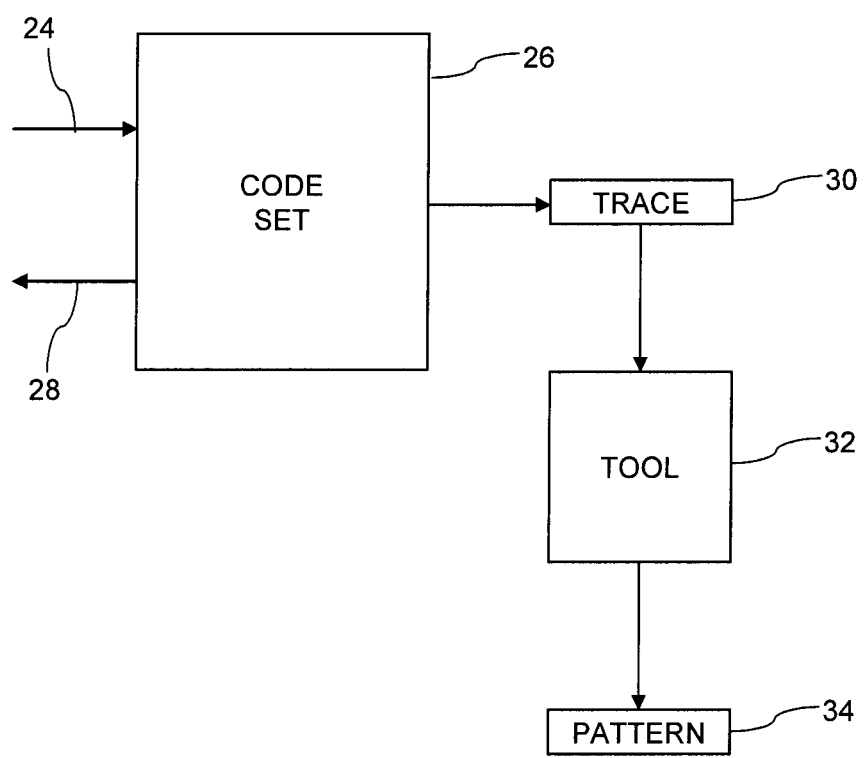
FIG. 2 is a schematic diagram of a code set for which requests are to be monitored in accordance with one or more aspects of the present invention.

In order to reduce the amount of trace data being retained, trace patterns are used herein to distinguish between a "good" trace and a "bad" trace. A good trace can be considered a normal path of a request through a code set, whereas a bad trace is an unexpected path of a request through a code set, which would tend to be more indicative of an error in processing. In order to make such a distinction it is first necessary to generate acceptable trace patterns. FIG. 2 illustrates the concept of a request 24 being received by a code set 26, which generates a response 28, while also generating a trace 30 for the specific request 24.

In order to generate patterns, firstly the trace 30 for the request 24 is captured. Then a tool 32 is used to convert this trace 30 into a pattern 34. Then this pattern is loaded into the system as a normal request pattern. This process is repeated for each request pattern that is judged to be good. A pattern 34 may be a sequence of method calls in modules or classes. For example, in a servlet environment, a trace pattern might be as follows (where the > symbol refers to entry into the named module and the <symbol refers to exit from the named module):

```
>MyServlet.init( )
<MyServlet.init( )
>MyServlet.get( )
>MySupportCode.doLogic( )
<MySupportCode.doLogic( )
>MySupportCode.doMoreLogic( )
<MySupportCode.doMoreLogic( )
<MyServlet.get( )
```

The pattern 34 can be more complex and can include the parameters sent in or returned optionally, including the specific type of a parameter. One use for this is if there is an exception handling method which takes an Exception super class, the pattern can specify this method should be entered with a concrete subclass of Exception such as UserErrorException. Thus only errors where this expected exception does not occur will be analyzed and traced. Traces 30 that are designated as normal, generated during a test operation of the code set 26, are used to generate the permissible patterns 34, which are then stored ready for use when the code set 26 is in normal operation.

When operating normally, the system would have trace enabled to write to disk. The system would need to identify a request and partition the trace per request. The separation could be done either when a request made a trace call or by the system in a second phase that processes trace output. This second phase could be implemented by a system task that splits out traces into separate files per request, for example in some application servers, a trace entry has a thread ID, therefore the trace output can be split by thread IDs into separate files. Similarly, for other types of transaction servers, each transaction has a task number and that identifier can be used to split the trace output.

Figure 3:
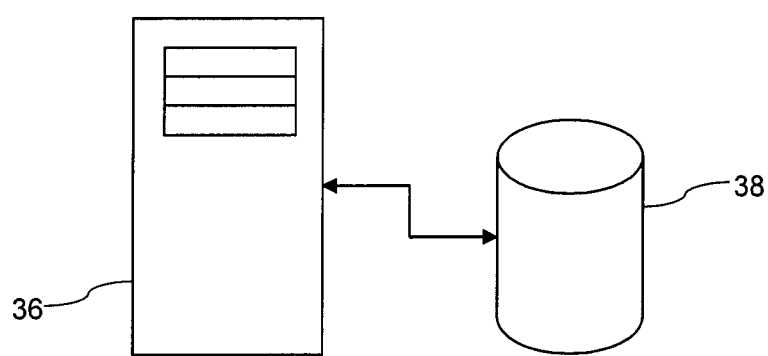
FIG. 3 is a schematic diagram of a server and a database, to implement one or more aspects of the present invention.

The use of the stored patterns provides a method by which useful trace data may be captured, but the amount of data captured is much reduced compared to an indiscriminate use of trace. The stored trace patterns are used to indicate which paths are normal for the system and so allow abnormal paths to be identified during execution. As described above, such patterns would preferably detail which code modules and functions are invoked, optionally with the contents of the entry and exit parameters, but no further detail. FIG. 3 shows a server 36, which has access to a database 38 storing the trace patterns which define acceptable paths of requests through the code set.

In one embodiment, while trace is enabled for the system run by server 36, the trace is captured to memory and at intervals, such as when a request completes or a buffer is filled, the trace is compared against the stored patterns in the database 38. If the request matches a normal pattern then the trace is deleted and therefore does not use any space on disk or memory. If the pattern is unusual and does not match any stored trace pattern, then the original trace is preserved and can be provided to support. In this way, only those traces that do not match trace patterns that are considered to be "good" will be stored by the system.

Figure 4:
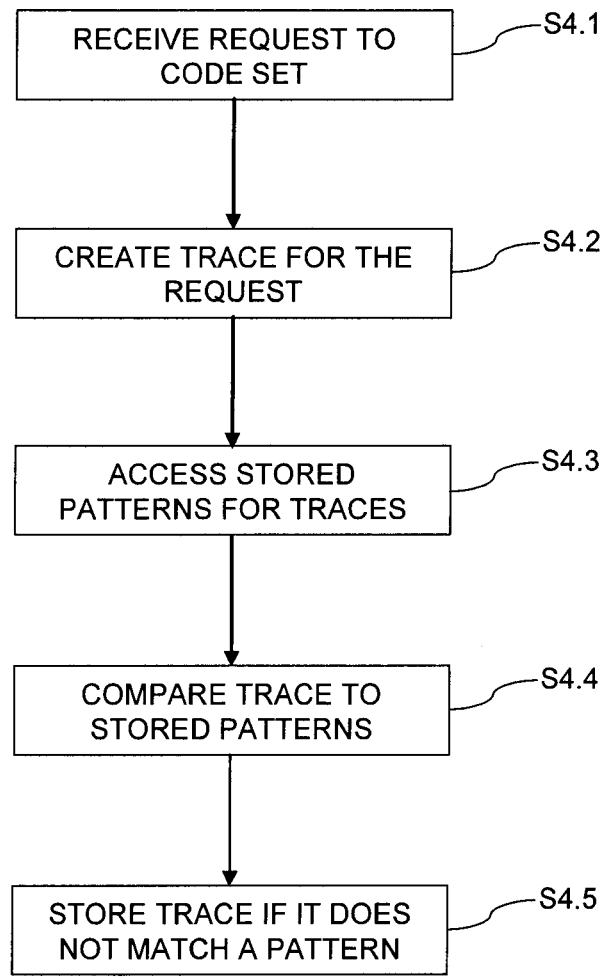
FIG. 4 is a flowchart of a method of monitoring requests to the code set, in accordance with one or more aspects of the present invention.

FIG. 4 summarizes one embodiment of a method of monitoring requests to the code set, in accordance with one or more aspects of the present invention. The method comprises, for instance, a first step S4.1, which includes receiving a request to the code set, a second step S4.2, which comprises creating a trace for the request, the trace defining the path of the request through the code set, a third step S4.3, which comprises accessing a plurality of stored trace patterns, each stored trace pattern defining an acceptable path of a request through the code set, a fourth step S4.4, which comprises comparing the created trace to the stored trace patterns, and a fifth step S4.5, which comprises storing the created trace if it does not match one of the stored trace patterns.

In an alternative embodiment, the stored patterns can be used to ignore trace calls for a request that is executing a normal path. If that request were then to deviate from that path the trace calls would result in trace data being recorded. This reduces the storage requirement for the trace data, and makes it simpler for the person analyzing the trace output to identify the one or two requests that are not executing as expected. In the embodiments described above, the trace data may be captured first to disk, and then deleted. In this alternative embodiment, the trace data is not captured to disk but is written to disk if it is unusual.

In an alternative embodiment, trace calls may be ignored when the request is matching a normal path, in which case the patterns may be held in memory. For performance reasons, this can be achieved by merging these patterns into a graph and a request position in the graph could be tracked. When a request makes a trace call, if that call matches a valid next node for the request then the request's location in the graph is updated and nothing is traced. If that call does not match a valid next node, then the request's last good position in the pattern would be written to the trace output along with the values in the current trace call, and the location in the graph for the request would be updated to a "no match" position, which would result in all subsequent trace calls for the request being written.

Partial pattern matching can be used as a precursor to deciding whether to keep trace data or not, where only those requests matching a partial pattern are traced. For instance, a second phase background task may monitor the trace, or an in-memory graph may be used, similar to the embodiment described above. The background task would, when a request completes, use the same logic as the above tool to convert the trace into a pattern. Then, this pattern may be compared against partial patterns, which may indicate that trace to be analyzed. If so, then the pattern is compared against known good patterns. If a match is found, then the trace is deleted from disk. If a match is not found, then the trace is left on disk, and the analyzer can write a log entry to indicate a bad pattern has been detected. The in-memory graph would track the current requests and either they would match the pattern and have a trace entry written or their location in the graph would be updated to be a "no trace" node.

For example, a partial trace pattern may be:
>MyServlet.get( )

So calls to other servlets need not be analyzed. But, calls to MyServlet, which use GET are analyzed. A bad pattern might be:

```
>MyServlet.init( )
>MyServlet.get( )
>MySupportCode.doLogic( )
>MySupportCode.handleError( )
>ServletContainer.handleRuntimeException( )
<ServletContainer.handleRuntimeException( )
```

Figure 5:
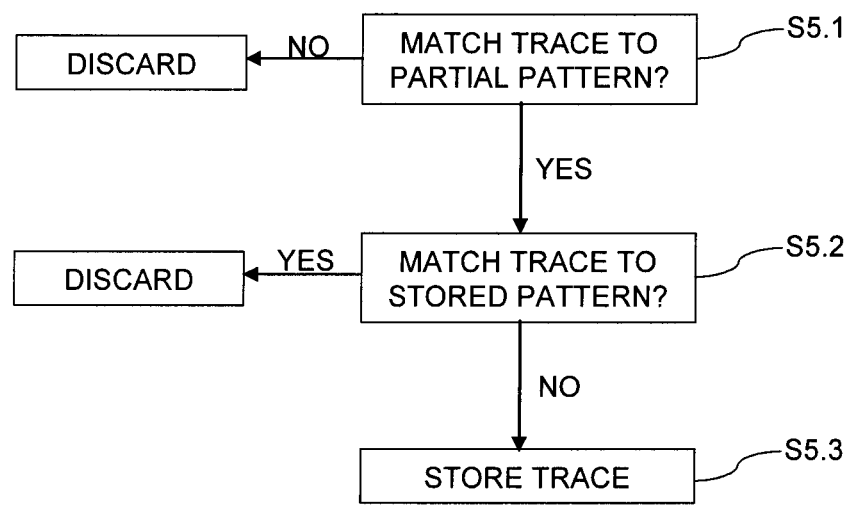
FIG. 5 is a flowchart of a method of monitoring requests using partial trace patterns, in accordance with one or more aspects of the present invention.

Here the code has failed in get, and then thrown an unhandled exception which the servlet container has had to deal with. FIG. 5 illustrates the basic principle in this process. At step S5.1, a check is made to see if the trace matches to a partial pattern. If it doesn't match then the trace is discarded. If it does match then a check is made at step S5.2 to see if the trace matches a stored pattern. If it does match, then the trace is discarded and only if there is no match to a stored (full) pattern is the trace stored at step S5.3. Essentially, this process operates by focusing on one particular area of the code set (which is defined by the partial pattern) and only stores those traces that do not match trace patterns already defined as "good".

In terms of how to match a tracepoint from a pattern to a running trace, below are two example traces statement from IBM WebSphere Application Server (WebSphere is a Registered Trade Mark of International Business Machines Corporation in many jurisdictions):

```
[06/01/14 15:17:22:101 GMT] 00000084 util      >
com.ibm.sr.sdo.helper.impl.BSRSDOHelperImpl addProperty ENTRY
com.ibm.serviceregistry.governance.sdo.impl.SubscriptionImpl@1f28465a
(classificationURIs: [ ], bsrURI: d413bbd4-62e8-48db.ba6f.f1d294f16fed, name:
Subscription to "Account creation service ?(1.0)?", namespace: , version: , description: ,
owner: admin, lastModified: 1369235510163, creationTimestamp: 1369235510163,
lastModifiedBy: admin) (subscribedTransitions: null, subscribedOperations: [update],
targetClassifications: null, emailAddress: null, locale: en, targetBsrURI: 9afa319a-bf21-
4102.a24d.1fbfb71f4d67, targetName: null, targetNamespace: null, targetVersion: null)
_expiryStartTime 1369235510139
```

-continued

```
[06/01/14 15:17:22:101 GMT] 00000084 util      <
com.ibm.sr.sdo.helper.impl.BSRSDOHelperImpl addProperty RETURN
```

Ignoring the various parameters the entry statement is:

```
[06/01/14 15:17:22:101 GMT] 00000084 util      >
com.ibm.sr.sdo.helper.impl.BSRSDOHelperImpl addProperty ENTRY
```

The timestamp can be ignored from the point of view of matching, only the order relative to other trace points matters. The thread ID 0000084 again can be ignored, but can be used when gathering trace from a single task, so all trace points on the same thread ID are for a single task. The component "util" can be ignored. The class name which was invoked is "com.ibm.sr.sdo.helper.impl.BSRSDOHelperImpl" and this forms part of the trace pattern and would need to match that in the pattern (whether in graph form or not). The method name is "addProperty" and this forms part of the pattern and would need to match. Finally the type (entry or exit) is indicated as "ENTRY" and this forms part of the trace pattern and would need to match.

In this way, raw trace data can be stripped of superfluous information and converted into a pattern based on the modules and functions entered, once a request has been received by a code set. By filtering the trace data with the trace patterns, only unusual and unexpected trace data will be captured and this will reduce the amount of storage required to handle the trace data, but will also make the task of the network administrator easier, as less data will be present. The stored trace data, after filtering, will only comprise those traces that did not match stored trace patterns and will be by definition unexpected traces, which are more likely to relate to errors or unusual operations within the code set and so can be studied in the event of support needing to be provided in respect of the code set.

The trace filtering can also be used to acquire system metrics. The system can be monitored to indicate the number of "bad" patterns encountered (i.e. those not matching stored trace patterns), or count the number of each pattern found, to provide some useful metrics to the users of the system. If a lot of bad patterns are starting to happen this could indicate some problem in the system. Such bad patterns could be generated by security attacks, other systems being used being down or unreliable. One advantage is that instead of enabling trace, a system administrator can be provided with a partial pattern for enabling trace analysis to load up. The administrator loads this and their system will only capture trace when the specified modules or functions are run. Alternatively, the user is provided with a set of good patterns, and then when enabling trace, only requests which look bad have their trace captured and saved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of monitoring requests to a code set within a computing environment, the method comprising:
    identifying occurrence of an execution error and obtaining an associated stack trace, the stack trace indicating a path of which modules of a code set were entered and exited prior to occurrence of the execution error;
    based on the identifying and the obtaining, pre-specifying a partial trace pattern of interest through the code set corresponding to the indicated path prior to occurrence of the execution error, the pre-specifying excluding from interest other code paths through the code set;
    receiving a request to the code set and, based on the receiving and the pre-specifying, executing the request on the code set;
    creating, during the executing, an execution trace of the request, the trace being dependent on the executing and defining an execution path of the request through the code set; and
    selectively retaining the created execution trace, the selectively retaining including:
        comparing the prespecified partial trace pattern to the created execution trace, the prespecified partial trace pattern having been prespecified before receiving the request;
        based on a corresponding part of the created execution trace not matching the prespecified partial trace pattern, deleting the created execution trace; and
        based on the corresponding part of the created execution trace matching the prespecified partial trace pattern portion, accessing a plurality of stored trace patterns, each stored trace pattern defining an acceptable request execution path through the code set, and comparing the created execution trace to the plurality of stored trace patterns, and storing the created execution trace as an abnormal path if it does not match one of the stored trace patterns.

2. The method of claim 1, wherein the selectively retaining further comprises deleting the created execution trace based on the created execution trace matching one of the stored trace patterns.

3. The method of claim 1, further comprising maintaining numerical data on a number of created execution traces that do not match one of the stored trace patterns and providing one or more outputs derived from the numerical data.

4. The method of claim 1, further comprising maintaining numerical data on a number of created execution traces that do match one of the stored trace patterns and providing one or more outputs derived from the numerical data.

5. A system for monitoring requests to a code set within a computing environment, the system comprising:
    a memory;
    a processor communicatively coupled to the memory, wherein the system performs a method comprising:
        identifying occurrence of an execution error and obtaining an associated stack trace, the stack trace indicating a path of which modules of a code set were entered and exited prior to occurrence of the execution error;
        based on the identifying and the obtaining, pre-specifying a partial trace pattern of interest through the code set corresponding to the indicated path prior to occurrence of the execution error, the pre-specifying excluding from interest other code paths through the code set;
        receiving a request to the code set and, based on the receiving and the pre-specifying, executing the request on the code set;
        creating, during the executing, an execution trace of the request, the trace being dependent on the executing and defining an execution path of the request through the code set; and
        selectively retaining the created execution trace, the selectively retaining including:
            comparing the prespecified partial trace pattern to the created execution trace, the prespecified partial trace pattern having been prespecified before receiving the request;

based on a corresponding part of the created execution trace not matching the prespecified partial trace pattern, deleting the created execution trace; and based on the corresponding part of the created execution trace matching the prespecified partial trace pattern portion, accessing a plurality of stored trace patterns, each stored trace pattern defining an acceptable request execution path through the code set, and comparing the created execution trace to the plurality of stored trace patterns, and storing the created execution trace as an abnormal path if does not match one of the stored trace patterns.

6. The system of claim 5, wherein the selectively retaining further comprises deleting the created execution trace based on the created execution trace matching one of the stored trace patterns.

7. The system of claim 5, wherein the system further performs maintaining numerical data on a number of created execution traces that do not match one of the stored trace patterns and provide one or more outputs derived from the numerical data.

8. The system of claim 5, wherein the system further performs maintaining numerical data on the number of created execution traces that do match one of the stored trace patterns and providing one or more outputs derived from the numerical data.

9. A computer program product for monitoring requests to a code set within a computing environment, the computer program product comprising:

a computer readable storage medium having program instructions embodied therewith, the program instructions being executable by a processor to perform a method comprising:

identifying occurrence of an execution error and obtaining an associated stack trace, the stack trace indicating a path of which modules of a code set were entered and exited prior to occurrence of the execution error;

based on the identifying and the obtaining, pre-specifying a partial trace pattern of interest through the code set corresponding to the indicated path prior to occurrence of the execution error, the pre-specifying excluding from interest other code paths through the code set;

receiving a request to the code set and, based on the receiving and the pre-specifying, executing the request on the code set;

creating, during the executing, an execution trace of the request, the trace being dependent on the executing and defining an execution path of the request through the code set;

selectively retaining the created execution trace, the selectively retaining including:

comparing the prespecified partial trace pattern to the created execution trace, the prespecified partial trace pattern having been prespecified before receiving the request;

based on a corresponding part of the created execution trace not matching the prespecified partial trace pattern, deleting the created execution trace; and based on the corresponding part of the created execution trace matching the prespecified partial trace pattern portion, accessing a plurality of stored trace patterns, each stored trace pattern defining an acceptable request execution path through the code set, and comparing the created execution trace to the plurality of stored trace patterns, and storing the created execution trace as an abnormal path if it does not match one of the stored trace patterns.

10. The computer program product of claim 9, wherein the selectively retaining comprises deleting the created execution trace based on the created execution trace matching one of the stored trace patterns.

11. The computer program product of claim 9, further comprising maintaining numerical data on a number of created execution traces that do not match one of the stored trace patterns and providing one or more outputs derived from the numerical data.

12. The computer program product of claim 9, further comprising maintaining numerical data on a number of created execution traces that do match one of the stored trace patterns and providing one or more outputs derived from the numerical data.

* * * * *